United States Patent
Khalil et al.

(10) Patent No.: US 10,407,275 B2
(45) Date of Patent: Sep. 10, 2019

(54) DETECTION AND CONTROL SYSTEM FOR ELEVATOR OPERATIONS

(71) Applicant: Otis Elevator Company, Farmington, CT (US)

(72) Inventors: Yehia F Khalil, Glastonbury, CT (US); Richard N Fargo, Plainville, CT (US); Randall Roberts, Hebron, CT (US); Randall S Dube, Glastonbury, CT (US); Gary L Nuschler, Plano, TX (US); Peter DePaola, Jr., South Windsor, CT (US); Arthur Hsu, South Glastonbury, CT (US); Tadeusz Pawel Witczak, Bethel, CT (US); Bruce P Swaybill, Farmington, CT (US); Alan Matthew Finn, Hebron, CT (US); Richard J Ericson, Southington, CT (US)

(73) Assignee: Otis Elevator Company, Farmington, CT (US)

( * ) Notice: Subject to any disclaimer, the term of this patent is extended or adjusted under 35 U.S.C. 154(b) by 578 days.

(21) Appl. No.: 15/179,079

(22) Filed: Jun. 10, 2016

(65) Prior Publication Data

US 2017/0355558 A1    Dec. 14, 2017

(51) Int. Cl.
*B66B 1/34* (2006.01)
*B66B 5/00* (2006.01)
*B66B 5/02* (2006.01)
*G01B 11/22* (2006.01)
*G01B 11/24* (2006.01)

(52) U.S. Cl.
CPC .............. *B66B 5/0031* (2013.01); *B66B 5/02* (2013.01); *G01B 11/22* (2013.01); *G01B 11/24* (2013.01)

(58) Field of Classification Search
CPC ......... B66B 5/0031; B66B 5/02; G01B 11/22; G01B 11/24
USPC ........ 187/247, 380–389, 391, 392, 393, 396
See application file for complete search history.

(56) References Cited

U.S. PATENT DOCUMENTS

| | | | |
|---|---|---|---|
| 5,025,895 A | 6/1991 | Leone et al. | |
| 5,283,400 A | 2/1994 | Leone et al. | |
| 5,387,768 A * | 2/1995 | Izard | G06F 7/00 187/392 |
| 6,050,369 A | 4/2000 | Leone et al. | |
| 6,202,797 B1 * | 3/2001 | Skolnick | A41D 13/00 187/279 |
| 6,339,375 B1 * | 1/2002 | Hirata | G01V 8/10 187/317 |
| 6,550,585 B2 * | 4/2003 | Schoppa | B66B 5/005 187/280 |
| 6,973,998 B2 | 12/2005 | Deplazes et al. | |

(Continued)

FOREIGN PATENT DOCUMENTS

| | | |
|---|---|---|
| CN | 201785104 U | 4/2011 |
| WO | 2007040538 A1 | 4/2007 |

*Primary Examiner* — Anthony J Salata
(74) *Attorney, Agent, or Firm* — Bachman & LaPointe, P.C.

(57) ABSTRACT

A sensor system for a passenger conveyance system includes a multiple of 3D sensors mounted to a movable structure within a vertical shaft and/or a horizontal shaft and a processing module in communication with the multiple of 3D sensors, the processing module operable to identify an obstruction within the horizontal or vertical shaft.

21 Claims, 7 Drawing Sheets

(56) References Cited

U.S. PATENT DOCUMENTS

| | | | |
|---|---|---|---|
| 7,140,469 B2 | 11/2006 | Deplazes et al. | |
| 7,201,256 B2 | 4/2007 | Deplazes et al. | |
| 7,382,895 B2 * | 6/2008 | Bramblet | G07C 9/00 |
| | | | 382/103 |
| 7,448,473 B2 * | 11/2008 | Lindberg | B66B 1/34 |
| | | | 187/384 |
| 7,588,127 B2 * | 9/2009 | Shiratsuki | B66B 1/3492 |
| | | | 187/391 |
| 7,650,969 B2 * | 1/2010 | Monzon | B66B 5/0068 |
| | | | 187/300 |
| 7,779,967 B2 * | 8/2010 | Kocher | B66B 5/0031 |
| | | | 187/249 |
| 7,954,606 B2 | 6/2011 | Tinone et al. | |
| 7,980,362 B2 * | 7/2011 | Kostka | B66B 5/0031 |
| | | | 187/249 |
| 8,020,672 B2 * | 9/2011 | Lin | B66B 1/34 |
| | | | 187/316 |
| 8,061,486 B2 | 11/2011 | Monzon et al. | |
| 8,261,885 B2 | 9/2012 | Ketoviita et al. | |
| 8,365,869 B2 * | 2/2013 | Stannah | B66B 9/08 |
| | | | 187/202 |
| 8,556,043 B2 | 10/2013 | Mangini et al. | |
| 9,359,171 B1 * | 6/2016 | Nowel | B66B 5/0056 |
| 9,365,393 B2 * | 6/2016 | Salmikuukka | B66B 1/3461 |
| 9,399,562 B2 * | 7/2016 | Terry | B66B 1/3492 |
| 9,481,548 B2 * | 11/2016 | Siddiqui | B66B 1/2416 |
| 2004/0173414 A1 | 9/2004 | Deplazes et al. | |
| 2006/0037818 A1 | 2/2006 | Deplazes et al. | |
| 2017/0355561 A1 * | 12/2017 | D'Apice | B66B 5/0081 |

* cited by examiner

DETECTION AND CONTROL SYSTEM FOR ELEVATOR OPERATIONS

BACKGROUND

The present disclosure relates to a detection and control system and, more particularly, to elevator systems equipped with an on-board detection system.

Elevator equipment typically requires routine inspection to ensure proper functionality. This inspection is necessarily performed in the horizontal or vertical elevator shafts or machinery spaces, sometimes with the inspector standing on the elevator car or in a separate service car while in a special service mode of operation. In other cases, the elevator service personnel may be within a car while multiple elevator cars may be independently in motion in horizontal or vertical elevator shafts.

Technologies that facilitate the safe behavior of service personnel, or provide an additional check on the motion of elevator cars in horizontal or vertical elevator shafts, or monitor machinery spaces, or that monitor safe behavior, would be particularly beneficial for health and safety.

SUMMARY

A sensor system for a passenger conveyance system according to one disclosed non-limiting embodiment of the present disclosure can include at least one sensor mounted to a movable structure within at least one of a vertical shaft and a horizontal shaft; and a processing module in communication with the at least one sensor, the processing module operable to identify an obstruction within the at least one vertical shaft and the horizontal shaft.

A further embodiment of the present disclosure may include, wherein the at least one sensor is mounted to at least one of a top, a base, a sidewall, and a temporary structure of the movable structure.

A further embodiment of the present disclosure may include, wherein the sensor is a depth-sensing sensor that includes at least one of structured light, phase shift, time of flight, stereo triangulation, sheet of light triangulation, light field cameras, coded aperture cameras, computational imaging techniques, simultaneous localization and mapping (SLAM), imaging radar, imaging sonar, scanning LIDAR, and flash LIDAR.

A further embodiment of the present disclosure may include, wherein the movable structure is at least one of a transfer cage, an elevator car, a service car, a counterweight.

A further embodiment of the present disclosure may include, wherein the processing module and sensor are self-contained.

A further embodiment of the present disclosure may include, wherein the processing module is operable to identify a shape of the obstruction.

A further embodiment of the present disclosure may include, wherein the obstruction includes a human.

A further embodiment of the present disclosure may include, wherein the obstruction extends beyond an edge of the movable structure.

A further embodiment of the present disclosure may include, wherein the processing module is operable to identify at least one of a closing velocity with the obstruction, a relative distance to the obstruction, and an impending collision with the obstruction.

A further embodiment of the present disclosure may include, wherein the processing module is operable to identify a velocity thereof.

A method of detecting an obstruction within an at least one of a vertical shaft and a horizontal shaft, according to one disclosed non-limiting embodiment of the present disclosure can include directing field of view (FOV) of at least one sensor into at least one of the vertical shaft and the horizontal shaft from a movable structure; and identifying an obstruction within the at least one vertical shaft and horizontal shaft with respect to the movable structure.

A further embodiment of the present disclosure may include directing the field of view (FOV) of the sensor at least one of upward, sideways, and downward into at least one of the vertical shaft and the horizontal shaft from the movable structure.

A further embodiment of the present disclosure may include directing the field of view (FOV) of the sensor from a temporary structure mounted to the movable structure.

A further embodiment of the present disclosure may include identifying a closing velocity to the obstruction.

A further embodiment of the present disclosure may include initiating a controlled deceleration in response to identifying at least one of a closing velocity with the obstruction, a relative distance to the obstruction, and an impending collision with the obstruction within at least one of the vertical shaft and the horizontal shaft.

A further embodiment of the present disclosure may include, wherein identifying the obstruction includes identifying damaged or misaligned guide rail.

A further embodiment of the present disclosure may include, wherein identifying the obstruction within at least one of the vertical shaft and the horizontal shaft includes inspecting a structure within the at least one of the vertical shaft and the horizontal shaft.

A further embodiment of the present disclosure may include, wherein identifying the obstruction within the at least one of the vertical shaft and the horizontal shaft includes inspecting a guide rail.

A further embodiment of the present disclosure may include, wherein identifying the obstruction within the at least one of the vertical shaft and the horizontal shaft includes identifying a human.

The foregoing features and elements may be combined in various combinations without exclusivity, unless expressly indicated otherwise. These features and elements as well as the operation thereof will become more apparent in light of the following description and the accompanying drawings. It should be appreciated; however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
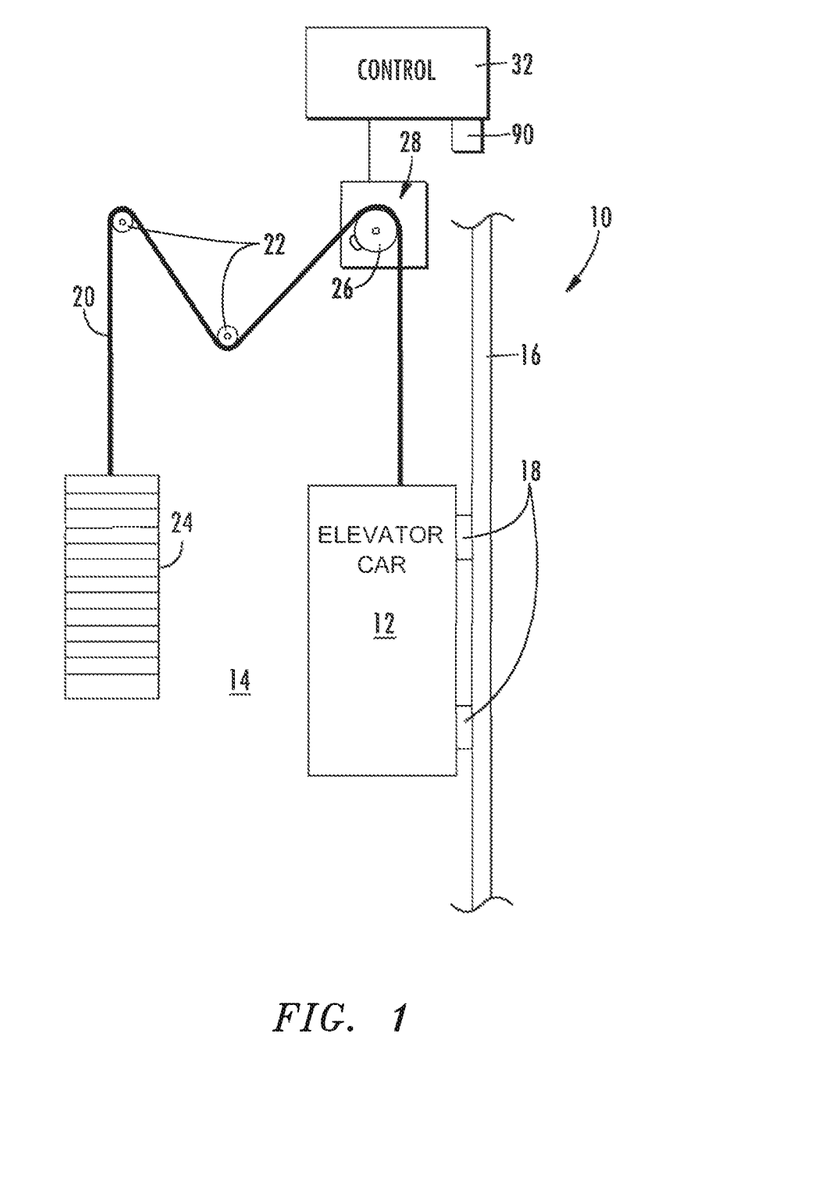
FIG. 1 is a schematic view of an embodiment of an example elevator system according to one disclosed non-limiting embodiment.

FIG. 1 schematically illustrates a passenger conveyance system 10. The system 10 includes an elevator car 12 located in a vertical shaft 14. The vertical shaft 14 includes one or more guide rails 16 interactive with one or more guides 18 of the elevator car 12 to guide the elevator car 12 along the vertical shaft 14. A suspension 20, typically a rope or a belt, suspends the elevator car 12 in the vertical shaft 14. It should be appreciated that although particular systems are separately defined, each or any of the systems can be otherwise combined or separated via hardware and/or software. It should also be appreciated that although one suspension 20 is shown, multiple suspensions 20 may be utilized. The suspension 20 may be routed over one or more sheaves 22 thence to a counterweight 24 which may also be disposed in the vertical shaft 14. One or more of the sheaves may be a drive sheave 26, operably connected to a machine 28 to control the elevator car 12 along the vertical shaft 14. It should be appreciated that although an elevator car 12 is utilized as an example movable structure within the vertical shaft 14, various movable structures such as a service car, lateral transfer device, and other movable structures, particularly self-propelled elevator cars, will benefit herefrom.

Figure 2:
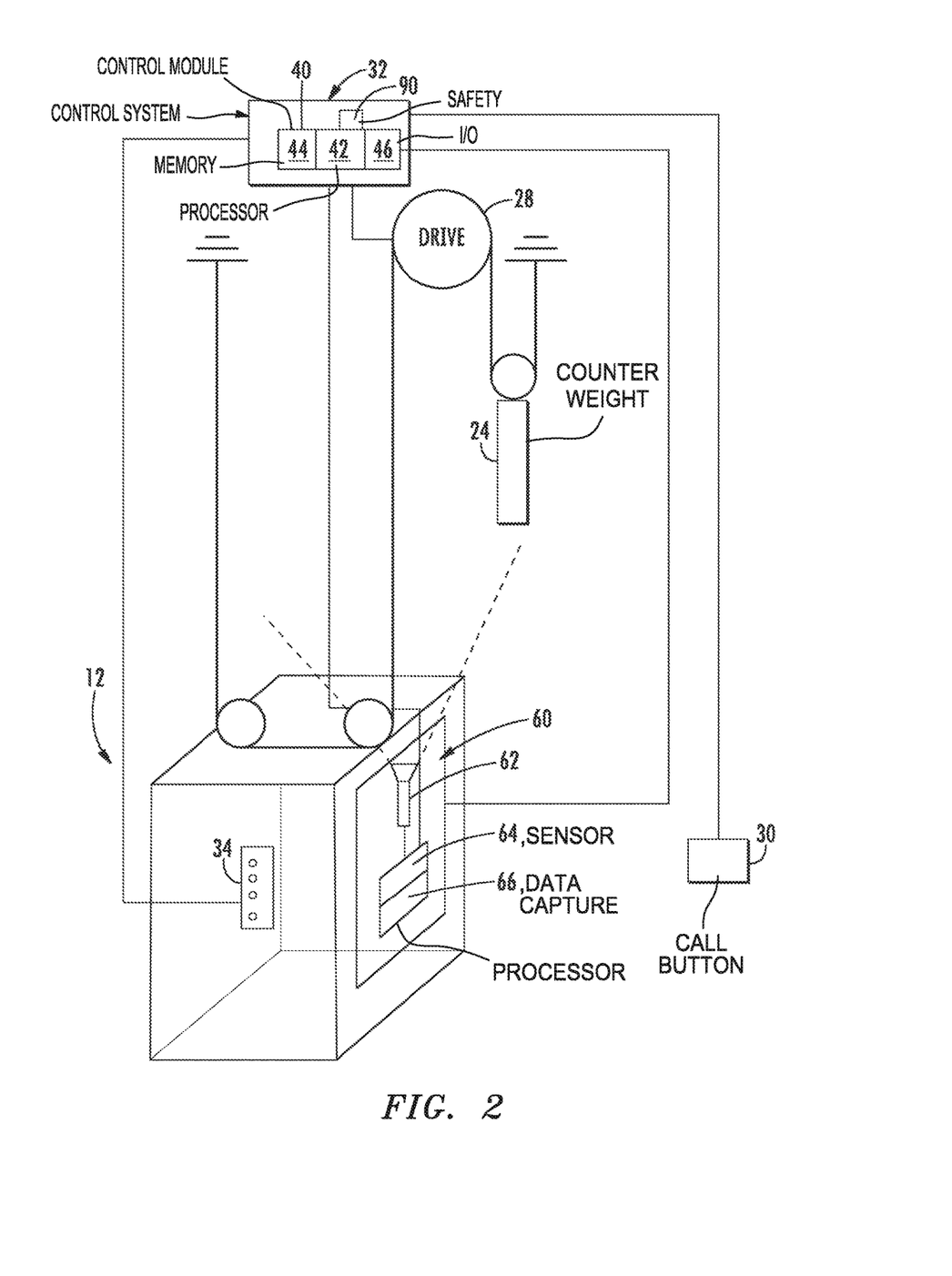
FIG. 2 is a schematic view of the elevator system with a sensor system according to one disclosed non-limiting embodiment.

With reference to FIG. 2, the system 10 can utilize a passenger initiated input via a call button 30 to notify the control system 32 of the presence of a passenger awaiting elevator service. In response, the control system 32 may dispatch the elevator car 12 to the appropriate floor. Optionally, once inside the elevator car 12, the passenger may push a button on the car-operating panel (COP) 34 designating the desired destination, direction, or the like, and then the control system 32 may dispatch the elevator car 12 to that destination.

The control system 32 can include a control module 40 with a processor 42, a memory 44, and an interface 46. The control module 40 can include a portion of a central control, a stand-alone unit, or other system such as a cloud-based system. The processor 42 can include any type of microprocessor or other processor having desired performance characteristics. The memory 44 may include any type of computer readable medium that stores the data and control processes disclosed herein. That is, the memory 44 is an example computer storage media that can have embodied thereon computer-useable instructions such as a process that, when executed, can perform a desired method. The interface 46 of the control module 40 can facilitate communication between the control module 40 and other systems.

A system 60 can include at least one sensor 62 (one shown) that communicates with a data capture module 64, and a processing module 66. The system 60 can be a portion of the control system 32, a stand-alone unit, or other system such as a cloud-based system in wired or wireless communication with the control system 32. Where there is more than one sensor 62, the multiple sensors 62 may communicate with each other or processor 42 to utilize joint estimation and/or logic to prevent false positive (spurious) signals or otherwise ensure validity of the signals from the sensors 62 before or during sensor signal processing.

The system 60 may also include wireless capabilities to permit temporary installation for service operations. That is, the system 60 may be emplaced only during certain times when maintenance occurs and then communicates with the control system 32. The system 60, in this optional self-contained embodiment, may include the data capture module 64, and the processing module 66 in a single package that can be placed in a desired location.

Figure 3:
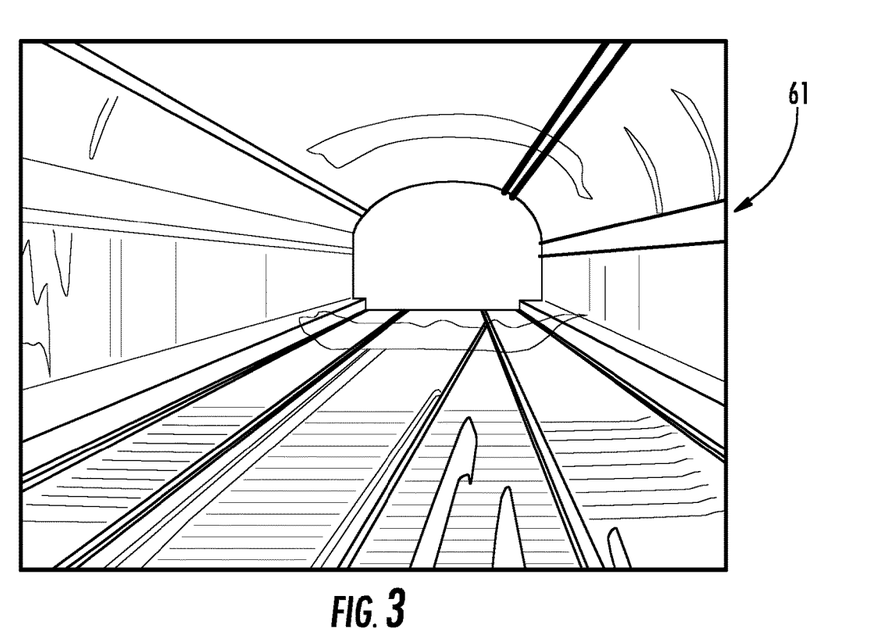
FIG. 3 is a schematic view of a depth map of an elevator vertical shaft.

In one example, the system 60 is operable to obtain depth map data 61, as described further below, (FIG. 3) adjacent to the elevator car 12. The depth map data 61 may encompass an area above, below, and/or around the elevator card. From the depth map data 61, processing may determine the presence of an obstruction or impending collision.

Each of the multiple sensors 62 in this disclosed non-limiting embodiment is a 1D, 2D, or 3D depth-sensing sensor. It should be appreciated that the term "sensor," is used throughout this disclosure for a sensor to generate one or more depth maps 61. Such a sensor can be operable in the electromagnetic or acoustic spectrum capable of producing a depth map (also known as a point cloud or occupancy grid) of the corresponding dimension(s). Various depth sensing sensor technologies and devices include, but are not limited to, a structured light measurement, phase shift measurement, time of flight measurement, stereo triangulation device, sheet of light triangulation device, light field cameras, coded aperture cameras, computational imaging techniques, simultaneous localization and mapping (SLAM), imaging radar, imaging sonar, laser radar, scanning LIDAR, flash LIDAR, or a combination comprising at least one of the foregoing. Different technologies can include active (transmitting and receiving a signal) or passive (only receiving a signal) and may operate in a band of the electromagnetic or acoustic spectrum such as visual, infrared, ultrasonic, etc.

Alternatively, or additionally, the sensor can be an infrared sensor with one or more pixels of spatial resolution, e.g., a Passive Infrared (PIR) sensor or an IR Focal Plane Array (FPA). In 2D imaging, the reflected color of an illumination source (a mixture of wavelengths) from the first object in each radial direction from the imager is captured. The 2D image, then, is the combined spectrum of the source illumination and the spectral reflectivity of objects in the scene. A 2D image can be interpreted by a person as a picture. In 1D, 2D, or 3D depth-sensing sensors, there is no color (spectral) information; rather, the distance (depth, range) to the first reflective object in a radial direction (1D) or directions (2D) from the sensor is captured. 1D, 2D, and 3D depth sensing technologies may have inherent maximum detectable range limits and can be of relatively lower spatial resolution than typical 2D imagers. 1D, 2D, or 3D depth sensing is typically immune to ambient lighting problems, offers better separation of occluding objects and better privacy protection than typical imagers.

Typically in depth sensing there is no color (spectral) information. Rather, each pixel is typically the distance (also called depth or range) to the first reflective object in each radial direction from the camera. The data from depth sensing is typically called a depth map or point cloud. 3D data is also sometimes considered as an occupancy grid wherein each point in 3D space is denoted as occupied or not.

The sensor 62, can be, in one example, an eye-safe line-scan LIDAR in which the field-of-view (FOV) can be, for example, about 180 degrees, which can horizontally cover the vertical shaft 14 (FIG. 2). For an active sensor, each data point in the scan represents the reflection of a physical object point in the FOV, from which range and horizontal angle to that object point can be obtained. From multiple scans, preferably taken at a fixed, known frequency, a metric or relative velocity may be determined. From the sensor-determined distance and the velocity, a time to potential collision may be determined. The scanning rate of LIDAR can be, for example, 50 ms per scan, which facilitates a reliable detection and tracking of objects. In one embodiment, the scanning rate can be greater than or less than 50 ms per scan. Before application of analytic processes via the processing module 66, the LIDAR scan data can be converted to an occupancy grid representation. Each grid represents a small region, e.g., 5 cm×5 cm. The status of the grid can be indicated digitally, e.g., 1 or 0, to indicate whether each grid square is occupied. Thus, each data scan can be converted to a binary map and these maps then used to learn a background mathematical model of the FOV, e.g. by using processes designed or modified for depth data such as a Gaussian Mixture Mathematical model (GMM) process, principal component analysis (PCA) process, a codebook process, or a combination including at least one of the foregoing. The multiple sensors 62 can be, in another example, a 2D eye-safe time-of-flight depth sensor or structured light sensor which outputs a 3D volumetric scan of the surrounding environment.

The processing module 66 may utilize various 3D detection and tracking processes such as mosaicking, background subtraction, spurious data filtering, and Kalman Filtering that can make the system more accurate. In particular, mosaicking may be used to build a background model for an entire horizontal or vertical shaft. Registration of a current FOV to the background model may be employed to segment foreground objects. Spurious data can be inherent to depth sensing and may vary with the particular technology employed. For active techniques, where a particular signal is emitted and subsequently detected to determine depth, (e.g., structured light, time of flight, LIDAR, and the like) highly reflective surfaces may produce spurious depth data, e.g., not the depth of the reflective surface itself, but of a diffuse reflective surface at a depth that is the depth to the reflective surface plus the depth from the reflective surface to some diffusely reflective surface. Highly diffuse surfaces may not reflect a sufficient amount of the transmitted signal to determine depth, which may result in spurious gaps in the depth map. Even further, variations in ambient lighting, interference with other active depth sensors or inaccuracies in the signal processing may result in spurious data. Object location or tracking may be based on a Bayesian Filtering method such as a Kalman Filter or a Particle Filter. It will be understood that these operations are carried out on 3D data and 2D algorithms with similar names may be appropriately modified to operate on 3D data.

In one embodiment, the one or more sensors 62 are mounted to the side of an elevator car 12 oriented to have a FOV upwards and/or downwards such that any obstruction, e.g., part or all of a service person, tool, equipment, etc., that projects beyond the plane of the side wall of car 12 will be detected. The 3D sensors 62 FOV may also be arranged to detect any horizontal or vertical shaft structure or object, e.g., horizontal or vertical shaft obstruction or structure, car in an adjacent lane, counterweight, etc., that a cab-top object or car itself might collide with.

Figure 4:
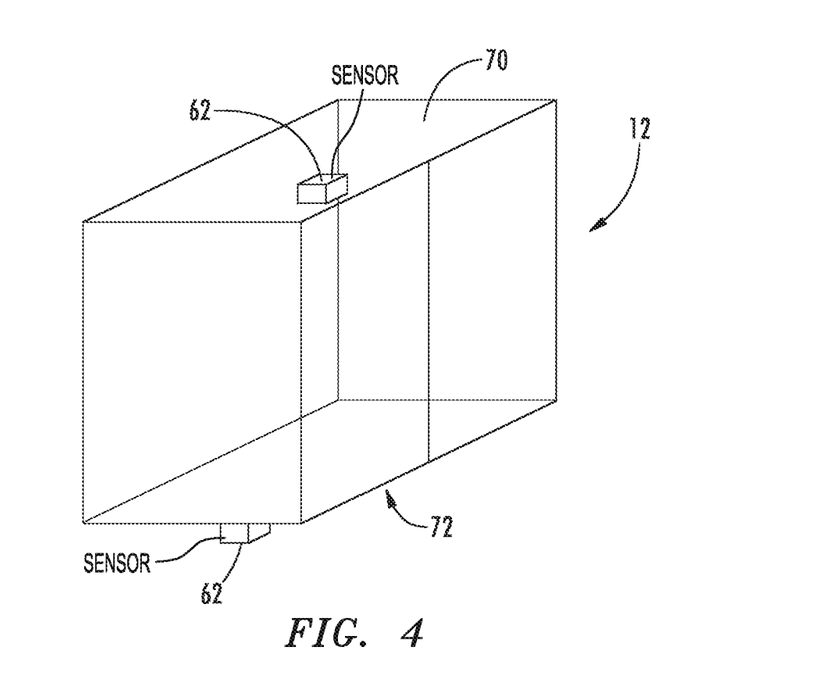
FIG. 4 is a schematic view of the elevator system with a sensor system according to another disclosed non-limiting embodiment.
Figure 5:
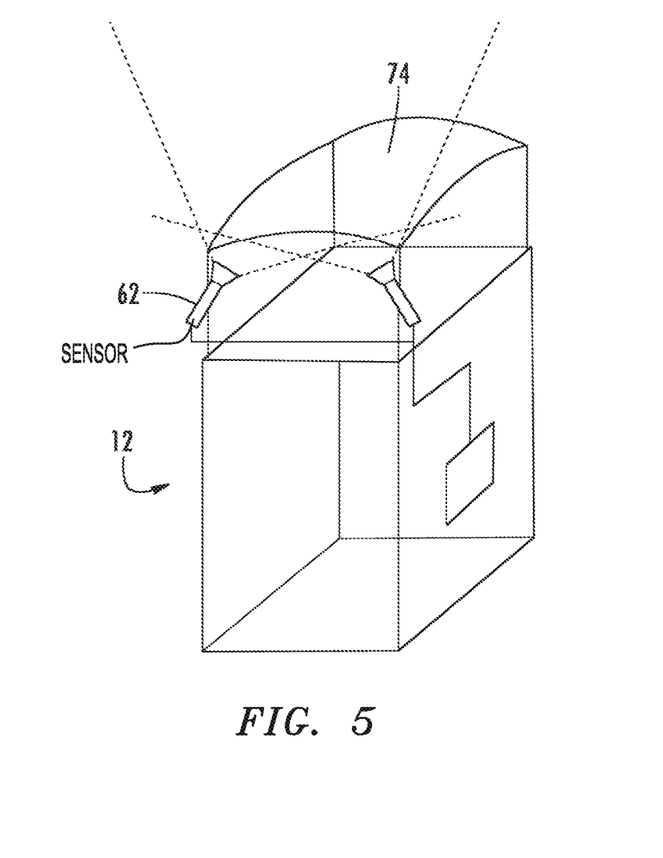
FIG. 5 is a schematic view of the elevator system with a sensor system according to another disclosed non-limiting embodiment.

With reference to FIG. 4, alternatively, or in addition, the sensors 62 may be mounted on a roof 70 of the car 12, a base 72 of the car 12, the sensors may be mounted on a temporary structure 74 (FIG. 5) mounted to the car 12 for worker protection, or may alternatively or in addition to the embodiments of FIGS. 4 and 5, the sensors 62 may be located on a service car 80 (FIG. 6) that is only located in the vertical shaft 14 for specific maintenance. The sensors 62 may be arranged to have mutual FOVs such that the depth maps from the 3D sensors 62 may be processed substantially independently or in a unified fashion. This may include individual or mutual calibration of the FOVs.

The system 60 operates to warn service personnel should they need to climb into the vertical shaft 14, transfer area 160 (FIG. 7), or other machinery spaces to perform required repair activities. In addition, although the other elevator cars are restrained from movement during maintenance, the system 60 provides a further safety feature should the service car 80 and/or elevator car 12 be moved toward an obstruction, a counterweight, a leading car, or any other object within the vertical shaft 14, transfer area 160 (FIG. 7), or other machinery space.

The system 60 may be in communication with the control system 32 which may include a safety 90 that is activated when system 60 identifies an obstruction or impending collision. The safety 90 may activate a mechanical device for stopping the car (or counterweight) by gripping the guide rails or other electrical system that operates as a braking device. The safety 90 operates through the control system 32 to secure the elevator car 12, the service car 12, to, for example, protect the service personnel.

Depending, for example, on a closing velocity, a relative distance to the obstruction, or other relationship, the safety 90 may provide signal for a controlled deceleration, an urgent stop, to maintain a predefined safe separation distance to protect service personal that may be located in the vertical shaft 14 and alternatively or additionally, shut down the entire vertical shaft 14. The depth based sensing for the sensors 62 facilitates the determination of the closing velocity such that a relatively high fidelity of control may be achieved. Further, the depth based sensing for the sensors 62 essentially maps the vertical shaft 14 (FIG. 3) such that the obstructions are readily identified and classified, for example, a tool that extends beyond an edge and into the vertical shaft 14 is readily detected and classified. The system 60 may also include on-board sensors (not shown) such as accelerometers to determine the velocity, acceleration, etc. of the car 12 upon which the self-contained system 60 is mounted. The on-board sensors may be used independently or jointly with information from sensors 62 for improved accuracy.

In another embodiment, the depth based sensing for the sensors 62 have sufficient fidelity to identify and inspect the horizontal or vertical shaft 14 such as identification of guide rails 16 that may have been damaged due to environmental events such as earthquakes. The identification of guide rail damage or misalignment may be achieved by one or more 3D sensors 62, in a geometric relationship if more than one, that sense the one or more guide rails and horizontal or vertical shaft walls, substantially simultaneously if more than one. The undamaged spatial relationship of the one or more guide rails to the horizontal or vertical shaft walls may be advantageously learned and saved for later reference. For inspection, the elevator car 12 may slowly traverse some of all of a horizontal or vertical shaft at a speed substantially below any resonant mode such that guide rail distortion will not shake elevator car 12.

Damage to guide rails 16 may be identified by a change in the distance from a guide rail surface to the corresponding shaft wall as compared to a learned undamaged relationship, by a change in the distance from a guide rail surface to the corresponding shaft wall as compared to statistics of the distance from the same guide rail surface to the corresponding shaft wall during the inspection, by a change in the rail to rail spacing as compared to a learned undamaged relationship, by a change in the rail to rail spacing as compared to statistics of the rail to rail distance during the inspection, and the like. In an alternative embodiment for inspection, the elevator car 12 may traverse some of all of a horizontal or vertical shaft at a speed whereby guide rail distortion will shake elevator car 12. In this case, guide rail damage may be identified by a change in the distance of elevator car 12 to horizontal or vertical shaft wall as compared to an absolute metric, to statistics of the distance as determined during the inspection, to a learned undamaged distance, and the like.

Figure 6:
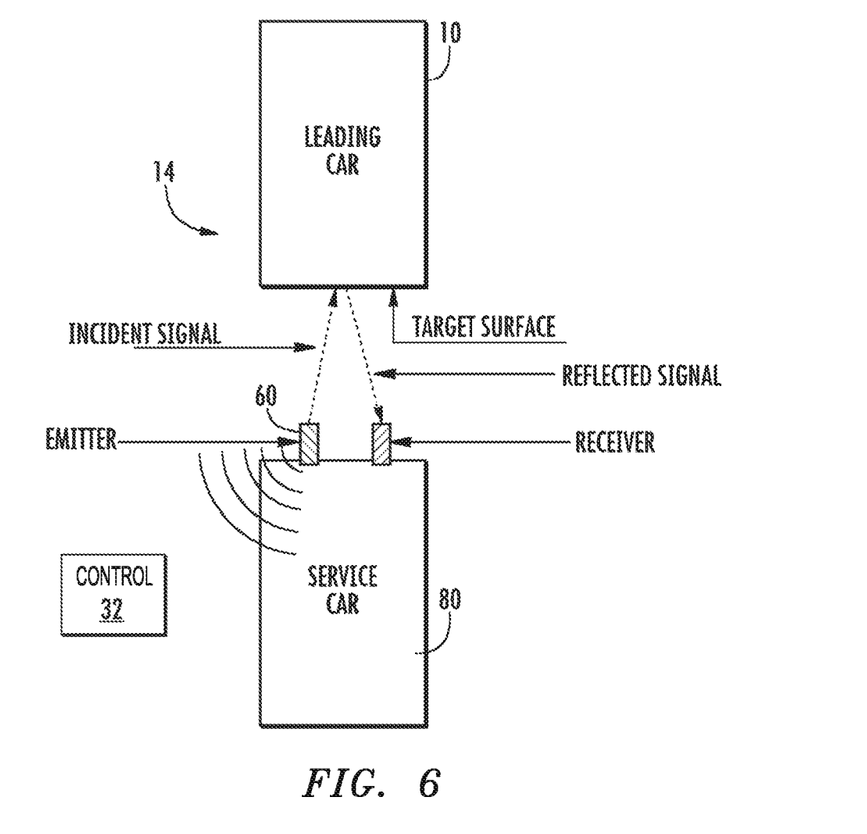
FIG. 6 is a schematic view of the elevator system with a sensor system according to another disclosed non-limiting embodiment.

With reference to FIG. 6, in an embodiment described elsewhere herein, one or more sensors 60 may be positioned on elevator car 12 or service car 80 with a FOV substantially parallel to horizontal or vertical shaft 14. Sensors 60 may include separate transmitting and receiving portions that may be collocated or may be separated. The transmitting portion provides an incident signal that reflects from a target surface as a reflected signal which is subsequently received by the receiving portion. To ensure that the incident signal reflects from the desired target surface, the transmitting portion may include acoustical, electromagnetic, or optical beamforming to focus the incident signal substantially away from other reflecting surfaces other than the desired target surface. To ensure that the reflected signal is reliably detected at the receiver portion, the transmitted signal may be modulated, i.e., encoded, by the transmitter portion such that decoding of the reflected signal by the receiver portion, e.g., by cross correlation, provides coding gain. Suitable encoding includes Barker codes, Complementary codes, pseudo-random codes, and the like.

Figure 7:
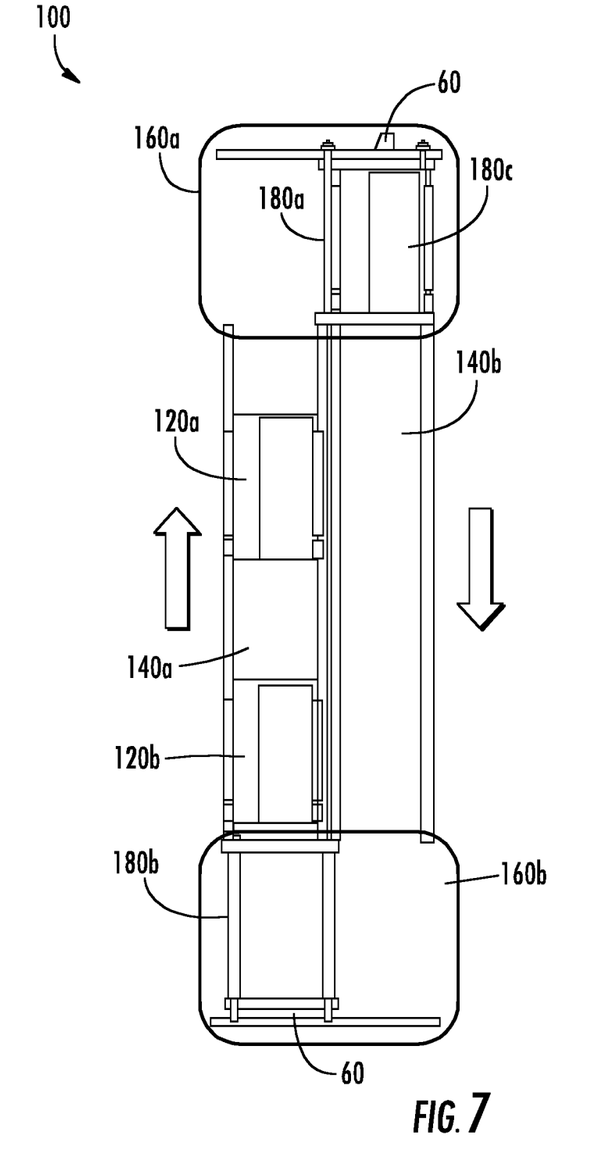
FIG. 7 is a schematic view of a self-propelled ropeless elevator system with a sensor system according to another disclosed non-limiting embodiment.

With reference to FIG. 7, in another disclosed non-limiting embodiment, a system 100 of this embodiment includes a first vertical shaft 140*a* configured for upward travel of a plurality of elevator cars 120*a*, 120*b*, and a second vertical shaft 140*b* configured for downward travel of the plurality of elevator cars 120*c*, which in this embodiment are self-propelled elevator cars 120 having independent drive systems. In some embodiments, more than one elevator car 120 is disposed in each vertical shaft 140*a*, 140*b*, thereby allowing for increased passenger traffic in the system 100. It should be appreciated that although particular systems are separately defined, each or any of the systems can include otherwise combined or separated via hardware and/or software.

Horizontal shafts 160 may be located at each end of the vertical shafts 120. A top horizontal shaft 160*a* is located at a top of the vertical shafts 140 and a bottom horizontal shaft 160*b* is located at a bottom of the vertical shafts 140. In the horizontal shafts 160, the cars 120*a*, 120*b*, 120*c* are transferred from one vertical shaft to another vertical shaft, e.g., 140*a* to 140*b*, so the cars' 120*a*, 120*b*, 120*c* direction of travel can be reversed from upward to downward or vice-versa, so the plurality of elevator cars 140 travel in a circulation pattern. In one embodiment, the horizontal shafts 160 may include guide rails analogous to vertical shaft 14, guide rail 16, and guidance 18.

With continued reference to FIG. 7, the elevator car 120*a* is proceeding upward in vertical shaft 140*a* followed by elevator car 120*b*. Elevator car 120*c*, having been transferred to vertical shaft 120*b* via the top horizontal shaft 160*a* is positioned to proceed downward, as will elevator cars 120*a* and 120*b* once each reaches the top horizontal shaft 160*a*. Once elevator car 120*c* reaches the bottom horizontal shaft 160*b*, elevator car 120*c* will be transferred to vertical shaft 120*a* and proceed upwardly, followed by elevator cars 120*a* and 120*b*. In this embodiment, all of the elevator cars 120 will proceed around the system 100 in a clockwise direction with elevator car 120*a* always following elevator car 120*c*, elevator car 120*b* always following elevator car 120*a* and elevator car 120*c* always following elevator car 120*b*. The movements of the elevator cars 120*a*, 120*b* and 120*c* are completely independent of each other, except that no elevator car 120*a*, 120*b* and 120*c* can overtake another elevator car 120*a*, 120*b* and 120*c*.

Each transfer area 160 may include a transfer cage 180*a*, 180*b*, which is laterally movable to transfer the elevator car 120*a*, 120*b* and 120*c* from the first vertical shaft to the second vertical shaft, e.g., from 140*a* to 140*b*. In this embodiment, the transfer cage 180 may include the system 60 as described above to identify movement in a horizontal direction. That is, the system 60 is operable to protect service personnel from movable structures, which, in this embodiment is the transfer cage. It should be appreciated that any movable structure within the vertical shafts will benefit from the system 60.

Although directed with respect to protecting service personnel whilst atop an elevator car, and/or operating a service car, and/or for preventing cars from approaching each other too closely, the system is equally applicable to detecting impending danger to service personnel or cars anywhere in the horizontal or vertical shafts with appropriate mounting, e.g., downwards to detect service personnel in a pit, adjacent to a horizontal shaft, etc. The system 60 may also be utilized for other non-service purposes, e.g., detecting people 'elevator surfing'.

Although the disclosed non-limiting embodiment is directed to an elevator system, the system is equally applicable to escalators, people movers, and other passenger conveyance systems. Equally, while taught with respect to a permanent installation, the system may also be installed on a temporary basis.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A sensor system for a passenger conveyance system, comprising:
at least one sensor mounted on a temporary structure mounted to an elevator car within at least one of a vertical shaft and a horizontal shaft, wherein the sensor is a depth-sensing sensor; and
a processing module in communication with the at least one sensor, the processing module operable to identify an obstruction within the at least one vertical shaft and horizontal shaft, wherein the processing module is operable to identify a closing velocity to the obstruction.

2. The system as recited in claim 1, wherein the sensor is a depth-sensing sensor that includes at least one of structured light, phase shift, time of flight, stereo triangulation, sheet of light triangulation, light field cameras, coded aperture cameras, computational imaging techniques, simultaneous localization and mapping (SLAM), imaging radar, imaging sonar, scanning LIDAR, and flash LIDAR.

3. The system as recited in claim 1, wherein the processing module and sensor are self contained.

4. The system as recited in claim 1, wherein the processing module is operable to identify a shape of the obstruction.

5. The system as recited in claim 1, wherein the obstruction includes a human.

6. The system as recited in claim 1, wherein the obstruction extends beyond an edge of the elevator car.

7. The system as recited in claim 1, wherein the processing module is operable to identify at least one of a closing velocity with the obstruction, a relative distance to the obstruction, and an impending collision with the obstruction.

8. A method of detecting an obstruction within an at least one of a vertical shaft and a horizontal shaft, comprising:
mounting a sensor on a temporary structure mounted to an elevator car, wherein the sensor is a depth-sensing sensor;
directing field of view (FOV) of the at least one sensor into at least one of the vertical shaft and the horizontal shaft from the elevator car; and
identifying an obstruction within the at least one vertical shaft and horizontal shaft with respect to the elevator car; and
identifying a closing velocity to the obstruction.

9. The method as recited in claim 8, further comprising directing the field of view (FOV) of the sensor at least one of upward, sideways, and downward into at least one of the vertical shaft and the horizontal shaft from the elevator car.

10. The method as recited in claim 8, wherein identifying the obstruction includes identifying that the obstruction extends beyond an edge of the elevator car.

11. The method as recited in claim 8, further comprising directing the field of view (FOV) of the sensor from the temporary structure mounted to the elevator car.

12. The method as recited in claim 8, further comprising initiating a controlled deceleration in response to identifying at least one of a closing velocity with the obstruction, a relative distance to the obstruction, and an impending collision with the obstruction within at least one of the vertical shaft and the horizontal shaft.

13. The method as recited in claim 8, wherein identifying the obstruction includes identifying damaged or misaligned guide rail.

14. The method as recited in claim 8, wherein identifying the obstruction within at least one of the vertical shaft and the horizontal shaft includes inspecting a structure within the at least one of the vertical shaft and the horizontal shaft.

15. The method as recited in claim 8, wherein identifying the obstruction within the at least one of the vertical shaft and the horizontal shaft includes inspecting a guide rail.

16. The method as recited in claim 8, wherein identifying the obstruction within the at least one of the vertical shaft and the horizontal shaft includes identifying a human.

17. A method of detecting an obstruction within an at least one of a vertical shaft and a horizontal shaft, comprising:
temporarily mounting a sensor to an elevator car, wherein the sensor is a depth-sensing sensor;
directing field of view (FOV) of the at least one sensor into at least one of the vertical shaft and the horizontal shaft from the elevator car;
identifying a shape of a guide rail within the at least one vertical shaft and horizontal shaft with respect to the elevator car;
identifying a closing velocity to an obstruction; and
initiating a controlled deceleration in response to identifying the closing velocity with the obstruction, a relative distance to the obstruction, and an impending collision with the obstruction within at least one of the vertical shaft and the horizontal shaft.

18. The method as recited in claim 17, wherein identifying the obstruction within the at least one of the vertical shaft and the horizontal shaft includes inspecting a guide rail.

19. The method as recited in claim 18, wherein identifying the obstruction includes identifying damaged or misaligned guide rail.

20. The system as recited in claim 1, wherein the processing module is operable to identify a shape of the obstruction.

21. The method as recited in claim 8, wherein identifying the obstruction comprises identifying a shape of the obstruction.

* * * * *